(12) United States Patent
Wentworth et al.

(10) Patent No.: US 10,967,812 B2
(45) Date of Patent: Apr. 6, 2021

(54) VEHICLE ACOUSTIC DASH PANEL SEAL AND GUIDE

(71) Applicants: Thomas F Wentworth, Sterling Heights, MI (US); Toon Shin Tan, West Bloomfield, MI (US)

(72) Inventors: Thomas F Wentworth, Sterling Heights, MI (US); Toon Shin Tan, West Bloomfield, MI (US)

(73) Assignee: FCA US LLC, Auburn Hills, MI (US)

(*) Notice: Subject to any disclaimer, the term of this patent is extended or adjusted under 35 U.S.C. 154(b) by 249 days.

(21) Appl. No.: 15/961,327

(22) Filed: Apr. 24, 2018

(65) Prior Publication Data
US 2019/0322228 A1    Oct. 24, 2019

(51) Int. Cl.
*B60R 13/08* (2006.01)
*G10K 11/162* (2006.01)
*B62D 1/16* (2006.01)

(52) U.S. Cl.
CPC ........ *B60R 13/083* (2013.01); *B60R 13/0846* (2013.01); *B62D 1/16* (2013.01); *G10K 11/162* (2013.01)

(58) Field of Classification Search
CPC .............. B60R 13/083; B60R 13/0846; B60R 13/0853
See application file for complete search history.

(56) References Cited

U.S. PATENT DOCUMENTS

| | | | | |
|---|---|---|---|---|
| 2,223,395 A | * | 12/1940 | Van Buren | B60R 13/083 296/39.3 |
| 2,250,510 A | * | 7/1941 | Van Buren | B60R 13/083 296/39.3 |
| 5,280,956 A | * | 1/1994 | Tanaka | B62D 1/195 280/752 |
| 5,557,078 A | | 9/1996 | Holwerda | |
| 5,975,609 A | | 11/1999 | Campbell | |
| 6,056,297 A | | 5/2000 | Harkrader et al. | |
| 7,878,544 B2 | | 2/2011 | Arce et al. | |
| 8,695,758 B2 | | 4/2014 | Fushiki | |
| 8,967,329 B2 | | 3/2015 | Chang et al. | |
| 2005/0046218 A1 | | 3/2005 | Campbell | |
| 2005/0218642 A1 | * | 10/2005 | Yamaguchi | B62D 1/16 280/779 |
| 2008/0231003 A1 | * | 9/2008 | Moriyama | B60R 13/0846 277/636 |
| 2008/0246229 A1 | * | 10/2008 | Ott | B60R 13/0853 277/634 |
| 2010/0108437 A1 | | 5/2010 | Bayle et al. | |

(Continued)

*Primary Examiner* — Barry Gooden, Jr.
(74) *Attorney, Agent, or Firm* — Ralph E Smith

(57) ABSTRACT

An acoustic dash panel seal and assembly guide for a vehicle having a dash panel with a shaft aperture configured to receive a steering column shaft includes a guide portion having a converging wall that converges from a first end to an opposite second end, and a flange portion extending from the converging wall first end. The guide portion second end is configured to be disposed proximate to the dash panel shaft aperture, and the guide portion first end is configured to receive the steering column shaft therein during assembly of the vehicle. The converging wall is configured to guide the steering column shaft toward and through the guide portion second end to thereby guide the steering column shaft through the dash panel shaft aperture.

14 Claims, 4 Drawing Sheets

(56) References Cited

U.S. PATENT DOCUMENTS

2013/0057015 A1\* 3/2013 Allen .................... F16J 15/3224
  296/70
2015/0130152 A1\* 5/2015 Kim ......................... F16D 3/84
  280/93.515
2016/0129855 A1 5/2016 Check et al.

\* cited by examiner

VEHICLE ACOUSTIC DASH PANEL SEAL AND GUIDE

FIELD

The present application relates generally to a vehicle dash panel and, more particularly, to an acoustic dash panel seal for a vehicle dash panel.

BACKGROUND

Vehicles typically include a wall or dash panel to separate the engine compartment from the passenger compartment. To reduce acoustic noise traveling from the engine compartment through the dash panel and into the passenger compartment, a sound barrier mat or interior dash silencer is mounted to the dash panel. However, in some vehicles, the dash panel must include a large enough clearance hole to allow a steering shaft to pass therethrough during an instrument panel loading and mounting. As a result, the dash silencer must be trimmed away from the hole to prevent any possibility of overlapping the clearance hole. This larger clearance hole, with the trimmed back dash silencer, may degrade silencing performance. Accordingly, while such systems work for their intended purpose, it is desirable to provide improved dash silencer systems.

SUMMARY

In accordance with one example aspect of the invention, an acoustic dash panel seal and assembly guide for a vehicle having a dash panel with a shaft aperture configured to receive a steering column shaft is provided. The acoustic dash panel seal and assembly guide includes, in an exemplary implementation, a guide portion having a converging wall that converges from a first end to an opposite second end, and a flange portion extending from the converging wall first end. The guide portion second end is configured to be disposed proximate to the dash panel shaft aperture, and the guide portion first end is configured to receive the steering column shaft therein during assembly of the vehicle. The converging wall is configured to guide the steering column shaft toward and through the guide portion second end to thereby guide the steering column shaft through the dash panel shaft aperture.

In addition to the foregoing, in various examples the described acoustic dash panel seal and assembly guide includes one or more of the following: a sound absorbing backing coupled to at least one of the guide portion and the flange portion, the sound absorbing backing configured to circumscribe the dash panel shaft aperture to facilitate reducing acoustic transfer therethrough; wherein the sound absorbing backing is at least one of a foam or fiber; wherein the sound absorbing backing is coupled about an outer surface of the converging wall and to an inner surface of the flange portion; and wherein the guide portion first end defines a passenger compartment side aperture, and the guide portion second end defines an engine compartment side aperture.

In addition to the foregoing, in various examples the described acoustic dash panel seal and assembly guide includes one or more of the following: wherein the passenger compartment side aperture is larger than the dash panel shaft aperture, which is larger than the engine compartment side aperture; wherein the passenger compartment side aperture is elliptical, and the engine compartment side aperture is circular; and wherein the guide portion and the flange portion are molded as an integral piece of plastic.

In accordance with another example aspect of the invention, a vehicle is provided. The vehicle includes, in one exemplary implementation, a body having a dash panel separating an engine compartment and a passenger compartment, a shaft aperture formed in the dash panel configured to receive a steering column shaft therethrough, and an acoustic dash panel seal and assembly guide coupled to the dash panel and configured to guide the steering column shaft through the shaft aperture. The acoustic dash panel seal and assembly guide includes a guide portion having a converging wall that converges from a first end to an opposite second end, and a flange portion extending from the converging wall first end. The guide portion second end is configured to be disposed proximate to the dash panel shaft aperture, and the guide portion first end is configured to receive the steering column shaft therein during assembly of the vehicle. The converging wall is configured to guide the steering column shaft toward and through the guide portion second end to thereby guide the steering column shaft through the dash panel shaft aperture.

In addition to the foregoing, in various examples the described vehicle includes one or more of the following: wherein the acoustic dash panel seal and assembly guide further includes a sound absorbing backing coupled to at least one of the guide portion and the flange portion, the sound absorbing backing configured to circumscribe the dash panel shaft aperture to facilitate reducing acoustic transfer therethrough; an interior dash silencer coupled to the dash panel so as to overlap at least a portion of the flange portion; and wherein the interior dash silencer comprises a sound absorbing layer coupled to a barrier layer.

In addition to the foregoing, in various examples, the described vehicle includes one or more of the following: wherein the dash panel has a plurality of studs extending therefrom, and the flange portion has a plurality of bosses formed therein, wherein the plurality of studs are inserted into the plurality of bosses to provide a desired orientation of the acoustic dash panel seal and assembly guide relative to the shaft aperture; a steering shaft bearing coupled to the dash panel about the steering column shaft, at least a portion of the steering shaft bearing extending through the shaft aperture and the guide portion second end; wherein the guide portion first end defines a passenger compartment side aperture, and the guide portion second end defines an engine compartment side aperture; wherein the passenger compartment side aperture is larger than the dash panel shaft aperture, which is larger than the engine compartment side aperture; and wherein the passenger compartment side aperture is elliptical, and the engine compartment side aperture is circular.

In accordance with yet another example aspect of the present disclosure, a method of assembling a vehicle is provided. The method includes, in one exemplary implementation, providing a vehicle body having a dash panel separating an engine compartment and a passenger compartment, the dash panel having a shaft aperture formed therethrough, providing an acoustic dash panel seal and assembly guide having a guide portion with a converging wall that converges from a first end to an opposite second end, and a flange portion extending from the converging wall first end, and coupling the acoustic dash panel seal and assembly guide to the dash panel such that the guide portion second end is disposed proximate the dash panel shaft aperture. The method further includes providing an instrument panel with a steering shaft, and installing the instrument panel to the vehicle body by inserting steering shaft into the guide portion first end, and subsequently guiding the steering shaft to and through the guide portion second end with the converging wall such that the steering shaft is guided through the dash panel shaft aperture.

In addition to the foregoing, in one example the described method includes coupling an interior dash silencer to the dash panel such that at least a portion of the interior dash silencer overlaps and is sealed to the flange portion.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

The present application is directed to an acoustic dash panel seal and assembly guide for a steering column shaft of a vehicle. The seal and assembly guide provides continuation of a dash silencer to an intermediate steering shaft bearing, while also guiding the steering column shaft through a dash panel clearance hole during instrument panel (IP) installation. This enables a smaller dash panel clearance hole and improved silencing of acoustic noise from the engine compartment, as is discussed below in greater detail.

Figure 2:
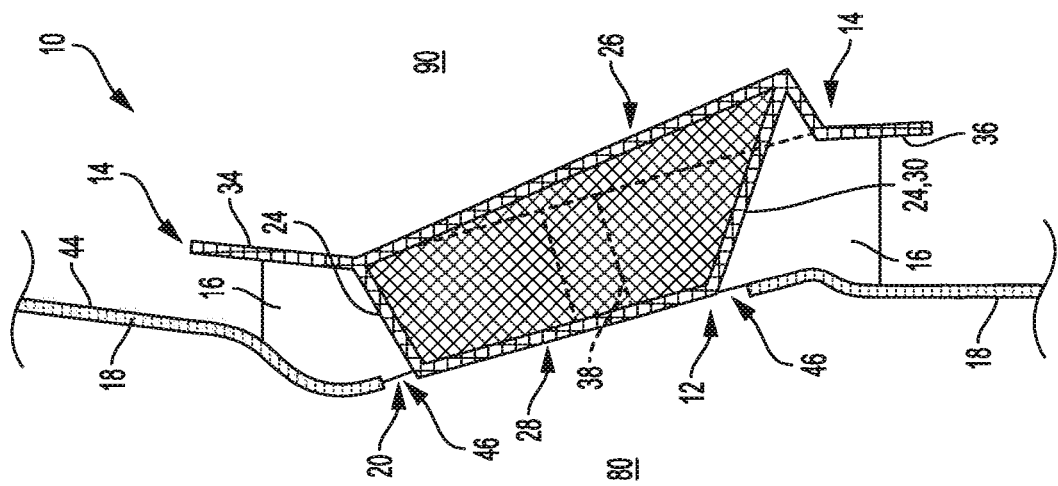
FIG. 2 is a cross-sectional view of the acoustic dash panel seal and assembly guide shown in FIG. 1 and taken along line 2-2, installed in an example vehicle dash panel in accordance with the principles of the present application.
Figure 1:
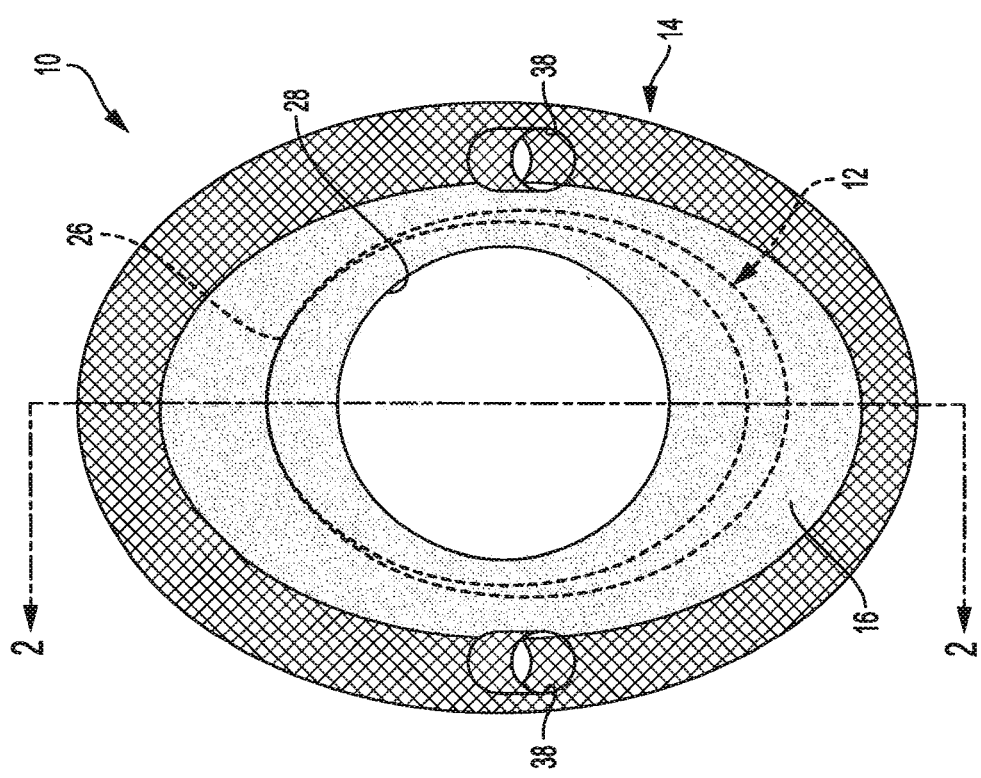
FIG. 1 is a side view of an example acoustic dash panel seal and assembly guide in accordance with the principles of the present application.

Referring to FIGS. 1 and 2, an example acoustic dash panel seal and assembly guide is generally shown and indicated at reference numeral 10. The acoustic dash panel seal and assembly guide 10 generally includes a guide portion 12, a flange portion 14, and a sound absorbing backing 16. In one example, guide portion 12 and flange portion 14 are a single piece component fabricated from a molded plastic, and sound absorbing backing 16 is subsequently coupled to guide portion 12 and/or flange portion 14. However, it will be appreciated that guide portion 12 and flange portion 14 may be formed as separate pieces and may be fabricated from any suitable material that enables seal and assembly guide 10 to function as described herein.

Figure 3:
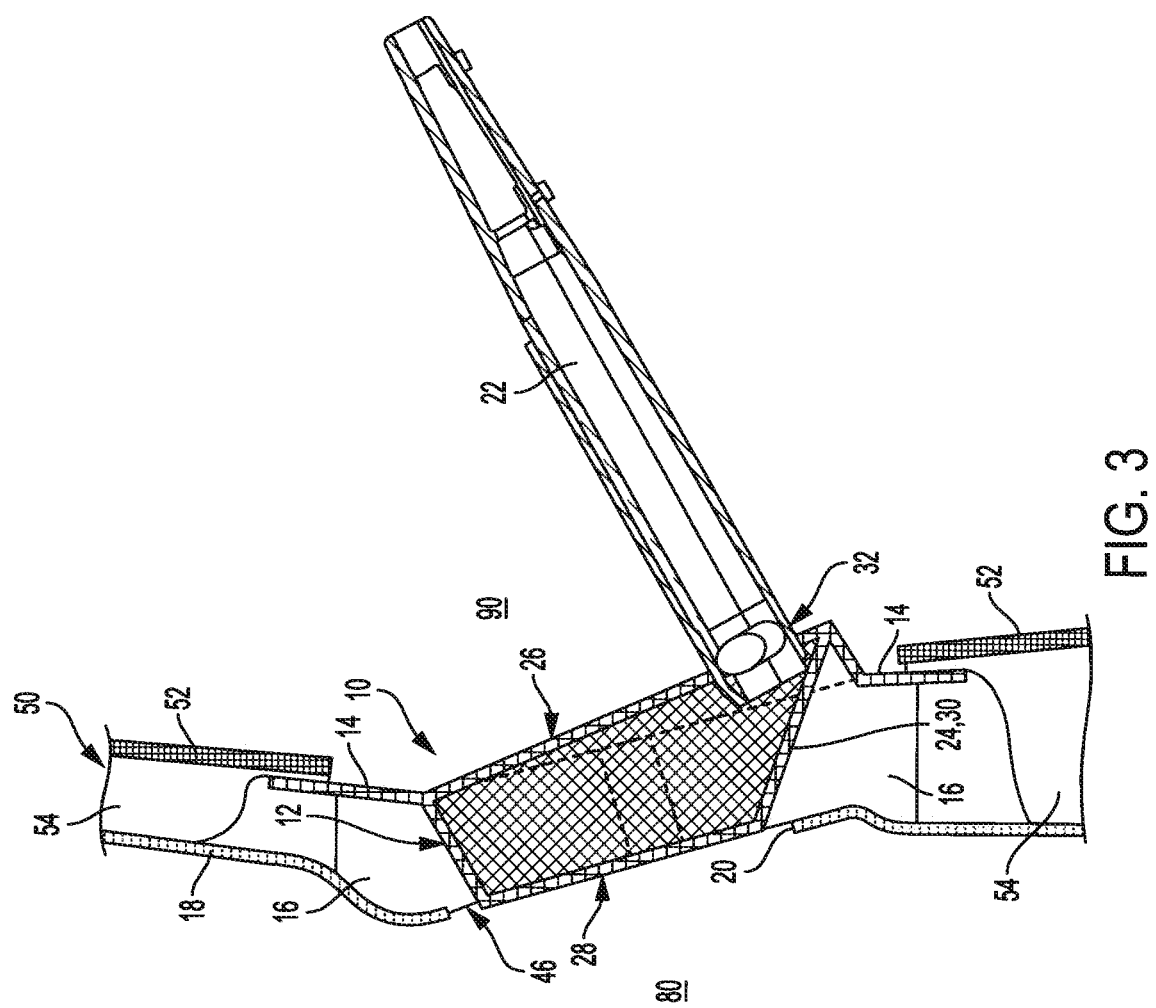
FIG. 3 is a cross-sectional view of the acoustic dash panel seal and assembly guide during an example assembly, in accordance with the principles of the present application.

As shown in FIG. 2, in the example embodiment, the acoustic dash panel seal and assembly guide 10 is positioned against a vehicle steel fire wall or dash panel 18, which separates a vehicle engine compartment 80 from a vehicle interior 90. The guide portion 12 extends proximate to or through a steering column aperture 20 formed in the dash panel 18. As shown in FIG. 3, in the example embodiment, the guide portion 12 is configured to guide a steering column shaft 22 through the dash panel aperture 20 during an installation of a vehicle instrument panel (not shown), which includes the steering column shaft 22.

In the example embodiment, guide portion 12 is generally cone or funnel shaped and includes a converging wall 24 that converges as it extends from a passenger compartment side aperture 26 to an engine compartment side aperture 28. Passenger side aperture 26 is configured to face toward vehicle interior 90, and engine side aperture 28 is configured to face toward engine compartment 80. As illustrated in FIG. 1, the passenger compartment side aperture 26 is generally elliptical while the engine compartment side aperture 28 is generally circular. In the illustrated example, the semi-major axis of the aperture 26 extends generally vertically between the vehicle top and bottom (not shown) such that the transition of the converging wall 24 between apertures 26 and 28 defines a ramped lower wall portion 30.

The example arrangement provides a larger aperture 26 to initially receive an end 32 of the steering column shaft 22. This enables the steering shaft 22 to successfully enter guide portion 12 even if shaft end 32 is off-center or off-axis during IP installation. As shown in FIG. 3, the ramped lower wall portion 30 is configured to contact and guide shaft end 32 upward toward the smaller aperture 28 and through dash panel shaft aperture 20. This obviates the need for a relatively larger dash panel aperture 20 to account for imprecise locating of the shaft end 32 during the IP installation.

In the example embodiment, the flange portion 14 is coupled to and extends from converging wall 24 about the passenger compartment side aperture 26. The flange portion 14 includes an outer surface 34 and an inner surface 36. As shown in FIG. 1, flange portion 14 includes a pair of bosses 38 formed therethrough, which are each configured to receive a stud (not shown) on the dash panel 18 to thereby quickly couple and/or orient the seal and assembly guide 10 thereto. Although shown extending from the outer surface 34 to the inner surface 36, bosses 38 may be blind and not extend through outer surface 34. Moreover, although flange portion 14 is illustrated with two bosses 38, it will be appreciated that flange portion 14 can have any number of bosses 38 that enables seal and assembly guide 10 to function as described herein.

As shown in FIG. 2, in the example embodiment, sound absorbing backing 16 is a sound absorbing material (e.g., foam or fiber backing) generally having an outer surface 40 and an opposite inner surface 42. The outer surface 40 is coupled to the outer surface of converging wall 24 and/or the flange inner surface 36. For example, an adhesive may be used to couple the sound absorbing backing 16 to the guide portion 12 and flange portion 14. In other examples, sound absorbing backing 16 is merely wedged or disposed between seal 10 and the dash panel 18. The inner surface 42 is configured to be disposed against a passenger compartment side surface 44 of the dash panel 18. In this way, sound absorbing backing 16 is configured to circumscribe aperture 20 and overlap or cover any gaps 46 existing between the dash panel 18 and the converging wall 24.

In the example implementation shown in FIG. 3, an interior dash silencer 50 is coupled to the dash panel 18 over the acoustic dash panel seal and assembly guide 10. The interior dash silencer 50 generally includes a barrier layer 52 with a sound absorbing material layer 54 (e.g., foam or PED fiber). As illustrated, flange portion outer surface 34 provides a sealing surface for interior dash silencer 50, which is configured to overlap seal and assembly guide 10. In some configurations, interior dash silencer 50 is configured to overlap one or more of the bosses 38. In still other configurations, interior dash silencer 50 is overmolded to acoustic dash panel seal and assembly guide 10 so as to form an integral component configured to subsequently couple to the dash panel 18.

Figure 4:
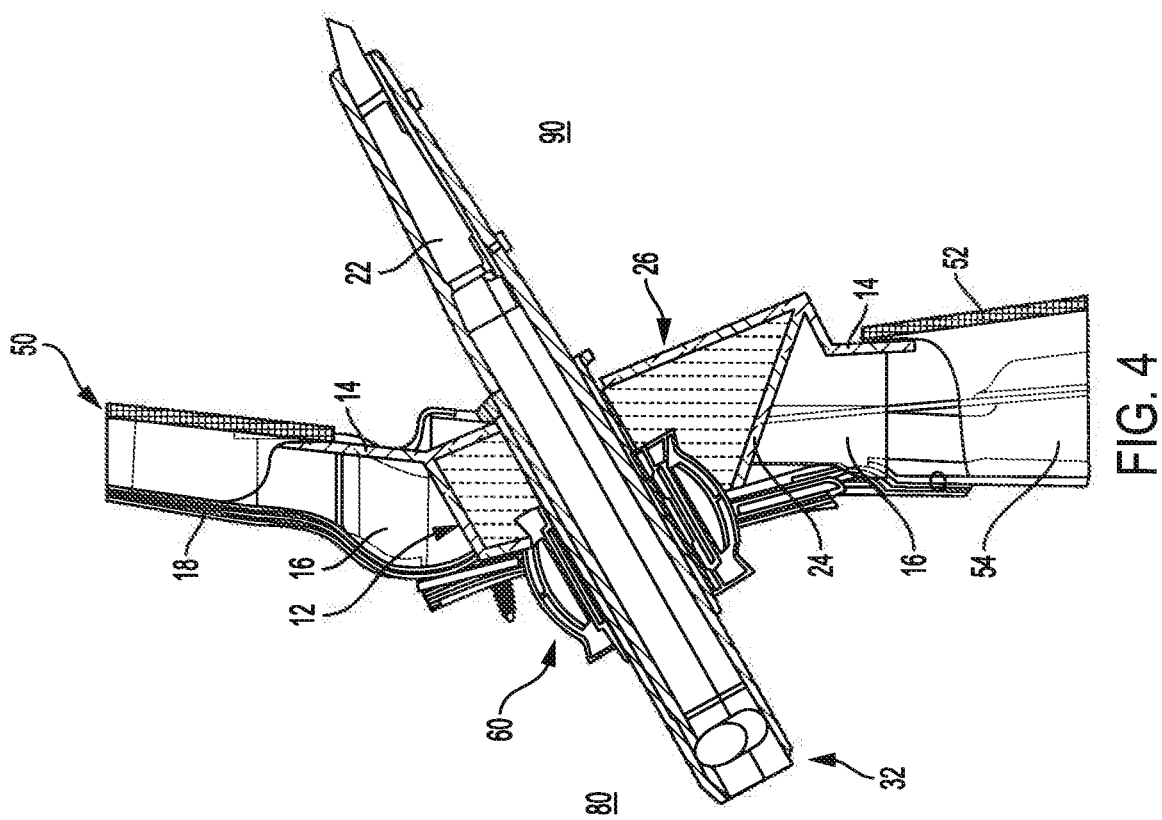
FIG. 4 is a cross-sectional view of the acoustic dash panel seal and assembly guide after assembly, in accordance with the principles of the present application.
Figure 5:
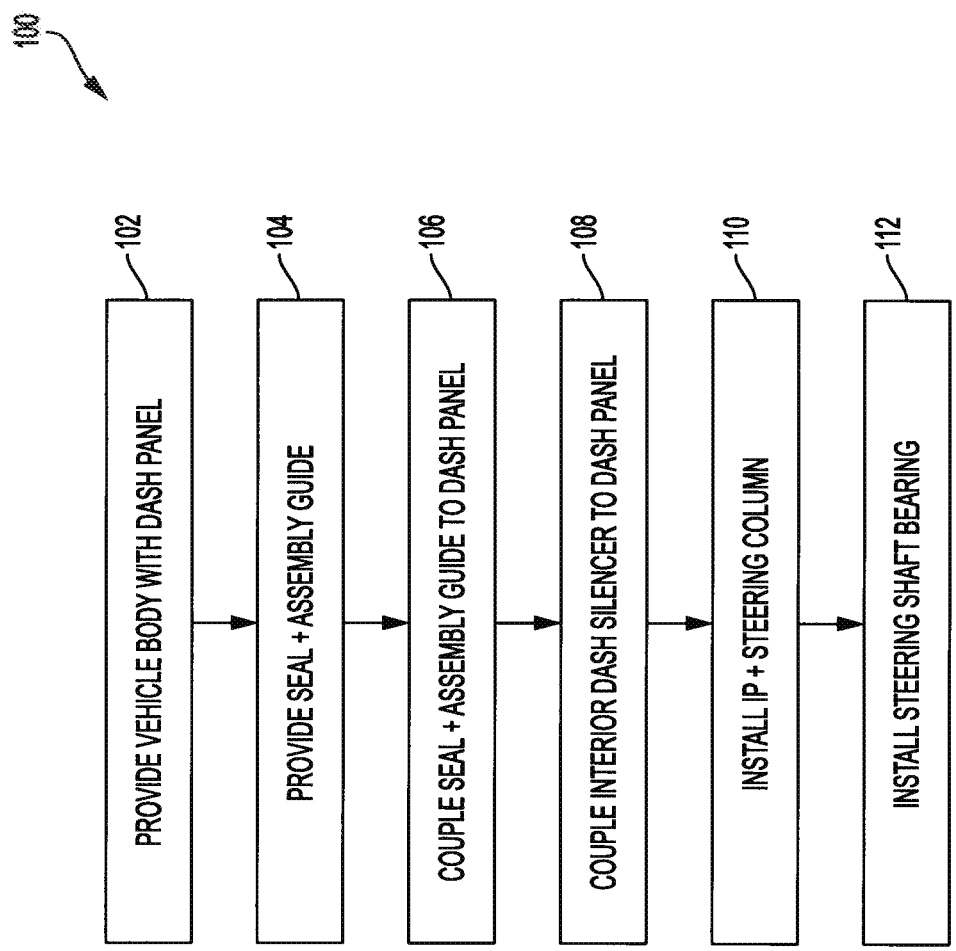
FIG. 5 is a flow diagram of an example method of assembling a vehicle in accordance with the principles of the present application.

FIGS. 4 and 5 illustrate an example method 100 of assembling a vehicle. The method begins at step 102 where a vehicle body is provided including a dash panel 18 with a steering column aperture 20 formed therein. At step 104, acoustic dash panel seal and assembly guide 10 is provided with guide portion 12, flange portion 14, and sound absorbing backing 16.

At step 106, acoustic dash panel seal and assembly guide 10 is positioned against and/or coupled to the dash panel 18 such that engine compartment side aperture 28 is disposed within or proximate to steering column aperture 20 and sound absorbing backing 16 circumscribes aperture 20. In one example, seal and assembly guide 10 is coupled to dash panel 18 by placing bosses 38 over the studs on the dash panel 18. At step 108, interior dash silencer 50 is coupled to dash panel 18 such that interior dash silencer 50 overlaps at least a portion of the flange portion 14. However, it will be appreciated that seal and assembly guide 10 could be installed before or after the interior dash silencer 50. This would merely alter which component is underneath the other regarding the overlap between the two components 10, 50. In still other arrangements, seal and assembly guide 10 may be integrated into a single component with interior dash silencer 50, which is formed from a rigid material such as injection molded TPO.

At step 110, an IP and steering column shaft are installed on the vehicle body by inserting the steering shaft end 32 first into the passenger compartment side aperture 26 and subsequently through the engine compartment side aperture 28 such that if steering column shaft end 32 engages converging wall 24, the converging wall 24 guides steering column shaft end 32 toward and through aperture 28 and thus through dash panel aperture 20. At step 112, a steering shaft bearing 60 (FIG. 5) is installed from the vehicle engine compartment 80 and coupled to the dash panel 18 about the steering column shaft 22.

Described herein are systems and methods for reducing noise transfer from a vehicle engine compartment to the vehicle interior. The systems include a funnel-shaped seal and installation guide that guides an intermediate steering column shaft into a dash panel aperture. During instrument panel installation, when the steering shaft is moving forward, the funnel guides the shaft through the dash panel aperture. The seal and installation guide includes a continuous flange around its perimeter to provide a sealing surface for an interior dash silencer to overlap and seal to. The described systems enable a smaller dash panel aperture to be used, thereby reducing the size of the aperture for unwanted acoustic transfer, and also enables typical dash silencer and assembly tolerances to be used to overlap the seal and installation guide without affecting NVH performance or IP assembly.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. An acoustic dash panel seal and assembly guide for a vehicle having a dash panel with a shaft aperture configured to receive a steering column shaft, the acoustic dash panel seal and assembly guide comprising:

a guide portion having a converging wall that converges from a first end to an opposite second end as the converging wall extends toward the shaft aperture; and a flange portion extending from the converging wall first end, wherein the guide portion second end is configured to be disposed proximate to the dash panel shaft aperture, and wherein the guide portion first end is configured to receive the steering column shaft therein from a passenger compartment of the vehicle during assembly of the vehicle, and the converging wall is configured to guide the steering column shaft toward and through the guide portion second end to thereby guide the steering column shaft through the dash panel shaft aperture, wherein the guide portion first end defines a passenger compartment side aperture, and the guide portion second end defines an engine compartment side aperture, and, wherein the passenger compartment side aperture is elliptical, and the engine compartment side aperture is circular.

2. The acoustic dash panel seal and assembly guide of claim 1, wherein the passenger compartment side aperture is larger than the dash panel shaft aperture, which is larger than the engine compartment side aperture.

3. The acoustic dash panel seal and assembly guide of claim 1, wherein the guide portion and the flange portion are molded as an integral piece of plastic.

4. The acoustic dash panel seal and assembly guide of claim 1, further comprising a sound absorbing backing coupled to at least one of the guide portion and the flange portion, the sound absorbing backing configured to circumscribe the dash panel shaft aperture to facilitate reducing acoustic transfer therethrough.

5. The acoustic dash panel seal and assembly guide of claim 4, wherein the sound absorbing backing is at least one of a foam or fiber.

6. An acoustic dash panel seal and assembly guide for a vehicle having a dash panel with a shaft aperture configured to receive a steering column shaft, the acoustic dash panel seal and assembly guide comprising:

a guide portion having a converging wall that converges from a first end to an opposite second end;

a flange portion extending from the converging wall first end; and a sound absorbing backing coupled to at least one of the guide portion and the flange portion, the sound absorbing backing configured to circumscribe the dash panel shaft aperture to facilitate reducing acoustic transfer therethrough, wherein the sound absorbing backing is coupled about an outer surface of the converging wall and to an inner surface of the flange portion;

wherein the guide portion second end is configured to be disposed proximate to the dash panel shaft aperture, and wherein the guide portion first end is configured to receive the steering column shaft therein during assembly of the vehicle, and the converging wall is configured to guide the steering column shaft toward and through the guide portion second end to thereby guide the steering column shaft through the dash panel shaft aperture.

7. A vehicle comprising:

a body having a dash panel separating an engine compartment and a passenger compartment;

a shaft aperture formed in the dash panel and configured to receive a steering column shaft therethrough;

an acoustic dash panel seal and assembly guide coupled to the dash panel and configured to guide the steering column shaft through the shaft aperture, the acoustic dash panel seal and assembly guide comprising:

a guide portion having a converging wall that converges from a first end to an opposite second end as the converging wall extends toward the dash panel and a front of the vehicle; and a flange portion extending from the converging wall first end, wherein the guide portion second end is configured to be disposed proximate to the dash panel shaft aperture, and wherein the guide portion first end is configured to receive the steering column shaft therein from a passenger compartment of the vehicle during assembly of the vehicle, and the converging wall is configured to guide the steering column shaft toward and through the guide portion second end to thereby guide the steering column shaft through the dash panel shaft aperture; and a steering shaft bearing coupled to the dash panel about the steering column shaft, at least a portion of the steering shaft bearing extending through the shaft aperture and the guide portion second end.

8. The vehicle of claim 7, wherein the dash panel has a plurality of studs extending therefrom, and the flange portion has a plurality of bosses formed therein, wherein the plurality of studs are inserted into the plurality of bosses to provide a desired orientation of the acoustic dash panel seal and assembly guide relative to the shaft aperture.

9. The vehicle of claim 7, wherein the acoustic dash panel seal and assembly guide further includes a sound absorbing backing coupled to at least one of the guide portion and the flange portion, the sound absorbing backing configured to circumscribe the dash panel shaft aperture to facilitate reducing acoustic transfer therethrough.

10. The vehicle of claim 9, further comprising an interior dash silencer coupled to the dash panel so as to overlap at least a portion of the flange portion.

11. The vehicle of claim 10, wherein the interior dash silencer comprises a sound absorbing layer coupled to a barrier layer.

12. The vehicle of claim 7, wherein the guide portion first end defines a passenger compartment side aperture, and the guide portion second end defines an engine compartment side aperture.

13. The vehicle of claim 12, wherein the passenger compartment side aperture is larger than the dash panel shaft aperture, which is larger than the engine compartment side aperture.

14. The vehicle of claim 13, wherein the passenger compartment side aperture is elliptical, and the engine compartment side aperture is circular.

* * * * *